United States Patent [19]

Yuguchi et al.

[11] 4,149,039
[45] Apr. 10, 1979

[54] FREQUENCY BAND COMPRESSION OF FDM USING TIME EXPANSION

[75] Inventors: Hiroshi Yuguchi, Fuchu; Makoto Nunokawa, Kawasaki; Taiichiro Nakai, Fujisawa, all of Japan

[73] Assignee: Kokusai Denshin Denwa Co., Ltd., Tokyo, Japan

[21] Appl. No.: 846,832

[22] Filed: Oct. 31, 1977

[30] Foreign Application Priority Data

Nov. 5, 1976 [JP] Japan .................................. 51-132322
Jul. 7, 1977 [JP] Japan .................................. 52-80469

[51] Int. Cl.² ............................ G10L 1/06; H04J 1/02
[52] U.S. Cl. ...................... 179/15.55 R; 179/15.55 T; 179/15 BW
[58] Field of Search ................. 179/15.55 R, 15.55 T, 179/1.5 A, 1.5 M, 15 AV, 15 AF, 15 BW, 15 FD, 15 FS

[56] References Cited

U.S. PATENT DOCUMENTS 3,786,195  1/1974  Shiffman ...................... 179/15.55 T

OTHER PUBLICATIONS

F. Lee, "Time Compression and Expansion of Speech by Sampling Method,", J. of AES, Nov. 1972, pp. 738-742.

Primary Examiner—Kathleen H. Claffy
Assistant Examiner—E. S. Kemeny
Attorney, Agent, or Firm—Armstrong, Nikaido, Marmelstein & Kubovcik

[57] ABSTRACT

A frequency band compression method, using Time Compression, for use with a frequency division multiplex (FDM) signal carrying voice signal. On the transmission end, the multiplexed signal is divided into a plurality of time segments, each segment having a certain duration, then deleting a part of the each segment and time-expanding the remaining part of the segment by a sawtooth variable delay, thus lowering the frequency of the signal to a predetermined ratio. On the receive end, the signal segments are compressed by a corresponding variable delay, thus making the received frequency higher and reproducing the original multiplexed voice signals.

8 Claims, 22 Drawing Figures

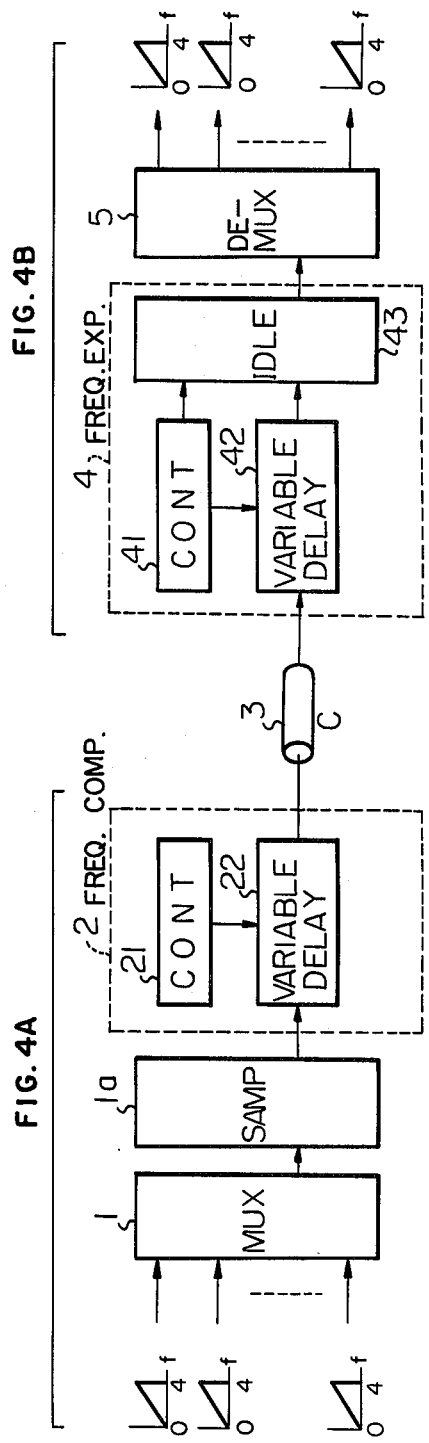

Fig. 9
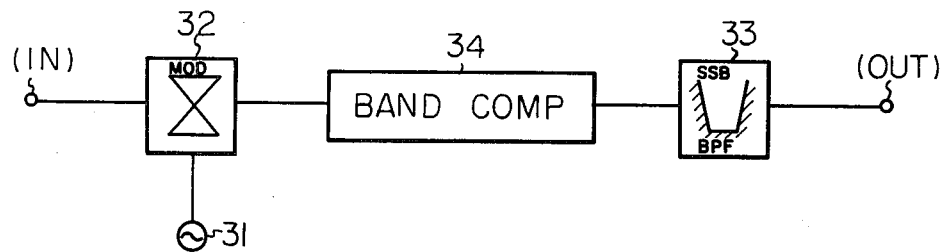
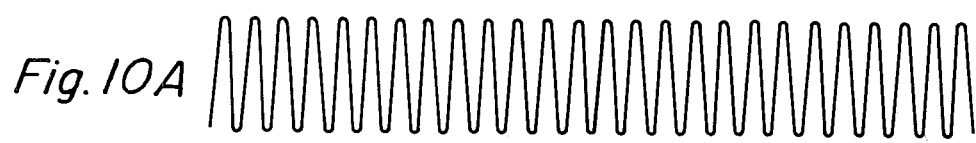
Fig.10A
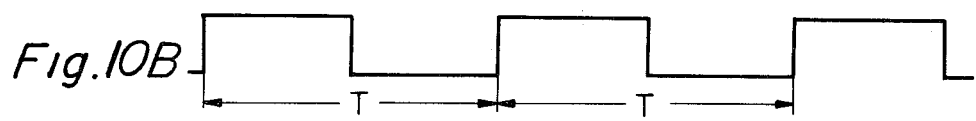
Fig.10B
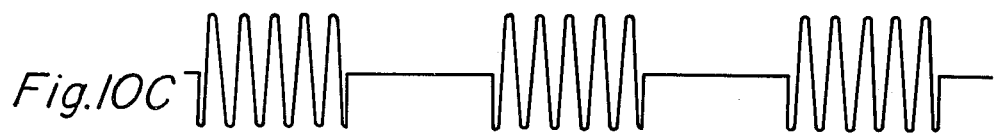
Fig.10C

FREQUENCY BAND COMPRESSION OF FDM USING TIME EXPANSION

BACKGROUND OF THE INVENTION

This invention relates to effective utilization of a transmission line through band compression of voice signals.

Typically, speech information is generated by human mouth and recognized to have significance only after it has been received and identified by human ear. In actual practice, however, voice containing an enormous amount of redundancy is transmitted. This indicates the existence of excessively much redundant portions not required for the purpose of delivering information. Most of the past studies on band compression technology of voice signals centered on this redundancy.

A prior band compression system has been aimed at reducing either the occupied band of individual voice signals or the occupied time rate. Therefore, at the transmitting terminal, a band compression system is provided for each circuit and its output is multiplexed by a multiplexor. At the receiving terminal the voice channel converter provides signals of individual channels, and then the original voice signals are restored from the band restoring device provided for each circuit. That is, a band compression and a restoration device are required for each circuit—limitations to be accepted if conventional technology is to be relied upon.

SUMMARY OF THE INVENTION

Improvements in the conventional technology with the above shortcomings can be made through this invention. The objective is to present a technology to reduce the voice signal band under the multiplexed condition of the signals. In order to attain this objective, signals are divided into multiple segments on the time axis at the transmitting terminal. Part of each segment is excised. The remaining segments are expanded by the variable delay circuit and are transmitted. At the receiving terminal, received signals are compressed by another variable delay circuit and, after which an idle signal is inserted in the blank part of the compressed segment.

BRIEF EXPLANATION OF THE DRAWINGS

The foregoing and other objects, features, and attendant advantages of the present invention will be appreciated, so that the same become better understood by means of the following description and accompanying drawings wherein;

FIGS. 4(A) and 4(B) form a block diagram of the communication system according to the present invention;

FIG. 9 is a still another block diagram of the communication system according to the present invention;

FIGS. 10(a) thru 10(c) show the explanation of the original signal and the rest of the removed signal;

DESCRIPTION OF THE PREFERRED EMBODIMENTS

In general, the intelligibility or the level of comprehensibility deteriorates only little even if a portion of voice signal is deleted. Further, it has long been known that through interpolation of the deleted portion the intelligibility scarcely deteriorates.

Figure 1:
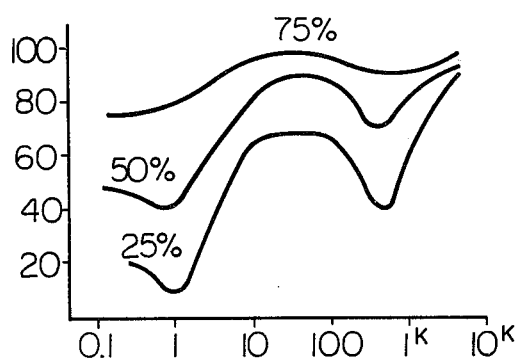
FIG. 1 shows the curve of the intelligibility when a voice signal is repetitively interrupted.

FIG. 1 illustrates the experimental example of changes in the intelligibility when voice signals are repeatedly interrupted (horizontal axis indicates signal interruption frequencies Hz, vertical axis is the level of articulation % and the parameter is the ratio of the rest of the voice to the whole voice).

It should be noted in FIG. 1 that even 50% removal on the time axis can provide 90% intelligibility.

With this invention, utilizing the above nature of voice, a transmission line can be effectively utilized through compression of the occupied frequency band, and in addition, band compression of the multiplexed voice signals can be made, something which has not yet been attempted.

According to this invention, voice is first multiplexed through a conventional system of frequency division. Then the voice signals are arranged on the frequency axis at a certain interval (normally 4 KHz). These multiplexed signals are continuous signals on the time axis.

FIG. 2 depicts the multiplexed signals on the time axis. According to this invention, the signals on this time axis are divided into multiple segments S1, S2, S3, S4, etc. having a certain time length T, (FIG. 2(A)).

Figure 2A:
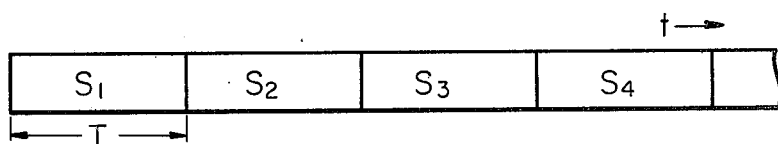
FIGS. 2(A) thru 2(D) explain the principle of the present invention.
Figure 2B:
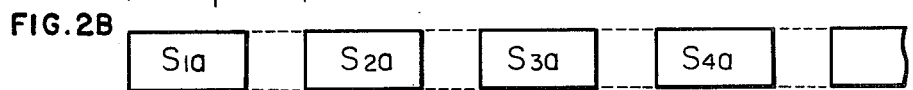
Figure 3A:
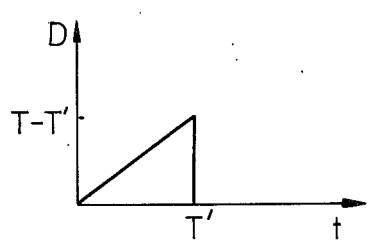
FIG. 3(A) and FIG. 3(B) show the characteristics of the variable delay circuit.

As indicated in FIG. 2(B), part of each segment is excised to obtain segments $S_{1a}$, $S_{2a}$, $S_{3a}$, $S_{4a}$, etc., each having a time length T'. Between the segments in FIG. 2(B), the blank time (T−T') evidently exists. At this stage, individual channels in the multiplexed signal can be identified to have been divided into segments of a certain length, and part of each segment is seen to have been excised. As mentioned earlier the level of intelligibility of voice signals scarcely deteriorates in spite of excision of their parts depending on the length of segments and the proportion of excised parts. As shown in FIG. 3(A), each segment illustrated in FIG. 2(B) passes through the variable delay circuit which causes the delay time τ to increase gradually in accordance with $$\tau = (T - T'/T)t$$

$$(0 \leq t \leq T')$$

Figure 2C:
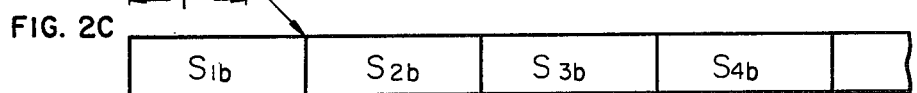
Figure 2D:
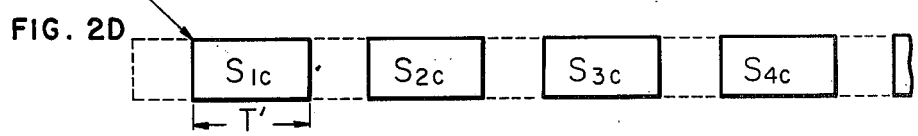

The segments return to their original lengths as illustrated in FIG. 2(c).

Figure 3B:
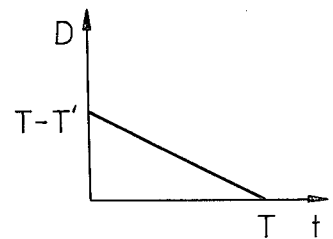

In FIG. 3(A) and FIG. 3(B), the horizontal axis indicates time and the vertical axis delay time. At this stage, any of the frequencies f in the original signals becomes $f \times (T'/T)$, and the required band is reduced by T'/T.

The very same operations are repeated with respect to all the signal segments following.

Thus, if the band reduced signals are transmitted through the transmission line, the required frequency band can be reduced by T'/T as compared with conventional transmission without band reduction.

For example, with respect to the multiplex voice signal of 60~108 KHz, supposing T'/T is ¾, the required band prior to reduction was 60~108 KHz (bandwidth 48 KHz), while it becomes 45~81 KHz (bandwidth 36 KHz) after the reduction.

At the receiving terminal the original frequency is restored through an inverse process. That is (FIG. 3(B)), each segment of the received signals passes through the variable delay circuit which causes the delay time to gradually decrease in proportion to time in accordance with $\tau=(T-T')(1-(t/T)(0t\leq T)$; the frequency of received signals is converted by T/T' fold. The frequency of the original signal is restored. The interpolation of dummy signals in the blank parts shown in FIG. 2(D), can improve the speech quality.

FIG. 4 illustrates a configuration of the communication system to which this invention is applied, where A is the transmitting terminal, B is the receiving terminal, and C is the transmission line. At the transmitting terminal A, multiple voice signals (bandwidth being 4 KHz each) become frequency division multiplex signals by the multiplexor 1. The multiplexed signals are sampled by the sampling circuit 1a which removes a part of the segments, and the rest of the segments are band compressed through the band compression unit 2 of the control circuit 21 and the variable delay circuit 22, and are then forwarded to the transmission line (C)3. At the receiving terminal B, each voice circuit is recovered through the voice channel converter 5, after the frequency band has been restored through the band restoring device 4, composed of the control circuit 41, the variable delay circuit 42 having the characteristic illustrated in FIG. 3(B), and the idle signal interpolation circuit 43 for improving the quality of voice.

Figure 5:
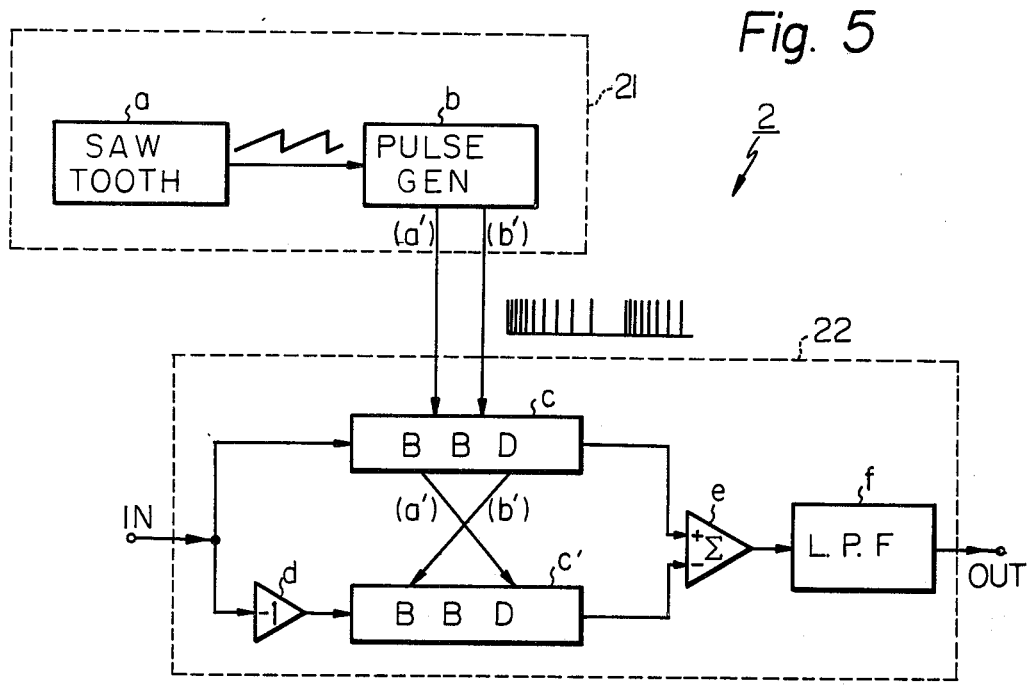
FIG. 5 is a block diagram of the band compression unit 2 in FIG. 4.

FIG. 5 is a block diagram of the band compression 2 consisting of the analogue storage elements, in which bucket brigade devices (B.B.D.), a type of electric charge transfer elements, are employed.

In the same drawing, the control circuit 21 has a saw-tooth wave generator (a) and variable period pulse generator (b). The latter generates two sets of pulse trains a' and b' having a time differential of ½ of the pulse interval, at a generation interval proportional to instantaneous voltage of the output of the saw-tooth wave generator (a)(that is, proportional to time).

The BBD element (C) in the variable delay circuit 22 is driven by the aforementioned two sets of pulse trains. The velocity of electric charge transfer of the BBD element is proportional to the period of the output pulse of the variable period pulse generator b. As mentioned above, because the pulse interval increase proportional to time, BBD operates as a variable delay element where the delay time gradually increases along with lapse of time.

As shown in FIG. 5, the voice quality is improved by adding another BBD element (C'), phase inversion circuit (d), signal adder (e), and a low pass filter (f). It will be readily understood that the band restoring device 4 can be readily constituted through inversion of what has been described above with respect to the relationship between the generation intervals of the aforementioned pulse and the time.

Other than BBD's, CCD's (charge coupled device) may be employed as electric charge transfer element. Use of the latter component is also applicable to this invention.

The present invention is more effective for a modulated multiplex voice channel than for a base band voice channel. The reason for this will be explained in detail below.

According to the present invention, a part of the original segment is sampled, and the sampled portion is transmitted in the same duration as the original segment. Thus, the band compression factor is expressed as T'/T, where T is the duration of the original segment and T' is the duration of the rest of the sampled segment. Accordingly, in order to improve the band compression factor, the ratio T'/T must be small.

Figure 6A:
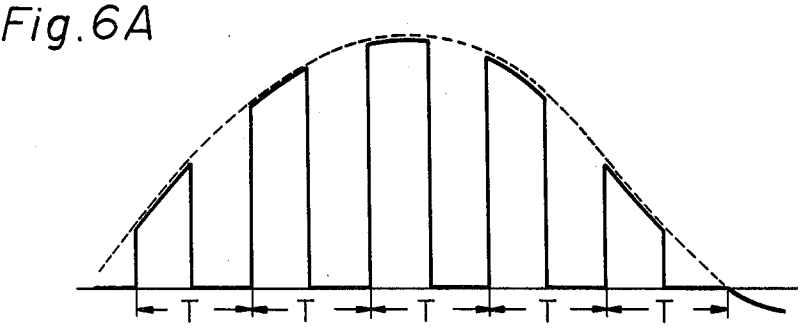
FIGS. 6(A) and 6(B) showing a drawing showing that the too short segment can not provide band compression.
Figure 6B:

Incidentally, when the length of the segment is shorter than the T/T' times the period of the original signal (the inverse of the minimum frequency of the original signal), the present invention is useless although a part of the segment is removed. The theory for this will be explained in accordance with FIGS. 6(A), and 6(B). In those figures, the solid line in FIG. 6(A) shows the waveforms where a part of the segment is removed, the solid line in FIG. 6(B) shows the waveforms processed by a time proportional delay circuit for the signal shown in the solid line in FIG. 6(A), and the dotted line in FIG. 6(B) is the waveform processed by a smoother for the solid line shown in FIG. 6(B). As shown in FIGS. 6(A) and 6(B), the solid line in FIG. 6(A) changes to the solid line in FIG. 6(B), and then changes to the dotted line in FIG. 6(B). Thus, the original waveform is restored although the signal is processed by a time proportional delay circuit and a time axis convertor.

The above matter will be explained from another viewpoints. As the minimum frequency in a telephone channel is 0.3 KHz, the length of the segment must be greater than 6.7 miliseconds, which corresponds to the duration of a single cycle of 0.15 KHz, on the condition that the frequency compression ratio is ½. On the other hand, the length of the segment must be shorter to prevent the speech clipping and to obtain a high compression ratio. It should be noted that the long segment would cause a speech clipping which deteriorates the articulation of the conversation.

Accordingly, in order to obtain a high compression ratio, and a short segment, the voice channel is multiplexed and modulated.

Figure 7:
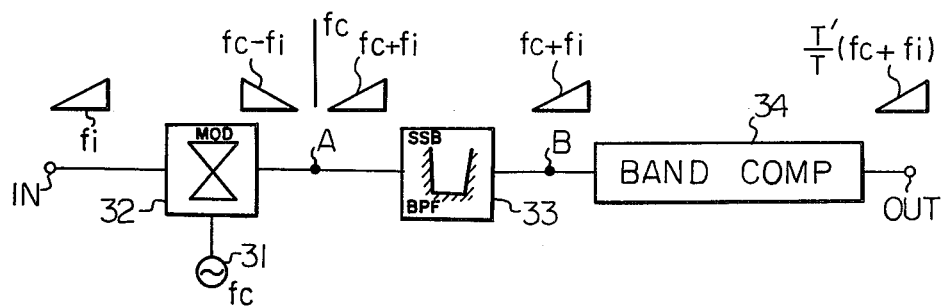
FIG. 7 is another block diagram of the communication system according to the present invention.
Figure 8A:
FIGS. 8(a) thru 8(c) show the operational waveforms in FIG. 7.

FIGS. 7 and 8 show another embodiment of the present invention. The original voice signal applied to the input terminal (IN) the frequency of which is $f_i$, is applied to the modulator 32, to which the output of the carrier generator 31 is also applied. The frequency of the carrier generator 31 is supposed to be $f_c$. The output of the modulator 32 is a both side band signal having a lower side-band of frequency $f_c-f_i$, the carrier of frequency $f_c$, and a higher side band of frequency $f_c+f_i$. Said both side band signal is applied to the band pass filter 33, which provides the single side band of $f_c+f_i$. And the band compression unit 34 processes the single side band signal and provides the compressed signal $(T'/T)\cdot(f_c+f_i)$.

FIG. 8 shows the waveforms of the apparatus in FIG. 7. The curve (a) shows the waveform of the original voice signal applied to the input terminal. The curve (b) shows the waveform at the output A of the modulator 32, and the envelope (p) is expressed $(1+a\cdot\sin 2\pi f_i t)$.

Figure 8B:
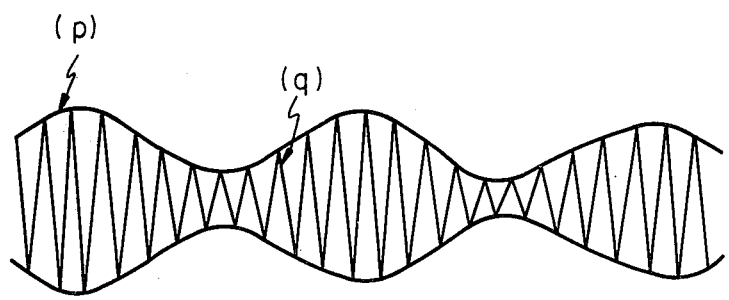
Figure 8C:

The carrier signal is modulated to the curve (q) which is expressed $(1+a\cdot\sin 2\pi f_i t)\cdot\sin 2\pi f_c t$. It should be noted that the original signal expressed $a\cdot\sin 2\pi f_i t$ exists on the envelope (p) as it stands. Since the repetition period of the signal in FIG. 8(b) is $1/f_i$, which is the same as the repetition period of the original signal, the possible length of the segment in FIG. 8(b) is the same as that in the original signal. The curve (c) in FIG. 8 is the waveform at the output B of the band pass filter 33, and is expressed $(a/2) \sin 2\pi(f_c+f_i)t$. It should be appreciated that the repetition period of the signal in FIG. 8(c) is $1/(f_c+f_i)$, which is shorter than the repetition period of the original signal $1/f_i$. Accordingly, in a modulated signal in a single side band system, the length of the segment can be shorter than that in the original signal. Since the carrier frequency $f_c$ can be arbitrarily designed higher than the frequency $f_i$ of the original signal, the length of the segment can be designed short regardless of the minimum frequency of the original signal.

FIG. 9 is a block diagram of still another embodiment of the present invention. In FIG. 9, the original signal applied to the input terminal (IN) is modulated by the modulator 32 which is also applied the carrier signal from the carrier generator 31. The amplitude modulation signal from the modulator 32 is next applied to the band compression unit 34, the output of which is then applied to the band pass filter 33. The nature of the output signal in FIG. 9 is the same as that in FIG. 7.

It should be appreciated that the original signal in FIG. 7 and FIG. 9 is not restricted to a single voice channel, but the multiplex voice channel through the frequency division principle can be treated as the original signal in FIGS. 7 and 9.

Now, the method for removing undesired noise generated in the above mentioned process is explained.

According to the present invention, a part of the original signal is removed. That is to say, the original signal shown in FIG. 10(a) is modulated by the rectangular signal shown in FIG. 10(b), and becomes the portionally removed signal shown in FIG. 10(c).

The rectangular waveform g(t) with the repetition period T is expressed below in a Fourier transformation.

$$g(t) = a_0 + a_1\sin\frac{2\pi}{T} \times t + a_2\sin\frac{4\pi}{T} \times t + a_3\sin\frac{6\pi}{T} \times t + \ldots$$

where $a_1, a_2 \ldots$ are constants. Accordingly, supposing that the original signal (or the single side band modulated signal) is $f(t)=\sin 2\pi f_i t$, the signal F(t) a part of which is removed is shown below.

$$F(t) = g(t) \cdot f(t)$$
$$= (a_0 + a_1\sin\frac{2\pi}{T} t + a_2\sin\frac{4\pi}{T} t + a_3\sin\frac{6\pi}{T} t +\ldots)\sin 2\pi f_i t$$
$$= a_0\sin 2\pi f_i t + \frac{a_1}{2}\{\cos 2\pi(f_i + \frac{1}{T})t - \cos 2\pi(f_i - \frac{1}{T})t\} + \frac{a_2}{2}\{\cos 2\pi(f_i + \frac{2}{T})t - \cos 2\pi(f_i - \frac{2}{T})t\} + \ldots$$

Figure 11A:
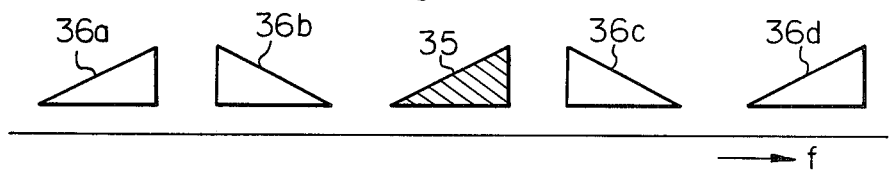
FIGS. 11(a) and 11(b) form a spectrum chart showing the undesired noise.

It is clear from the above formula that the signal the part of which is removed has many spectra in every 1/T Hz other than the original frequency component $f_i$. As the original signal has some frequency band, the frequency spectra shown in the above formula is shown in FIG. 11. FIG. 11(a) shows the case where the original signal 35 and the undesired spectra 36a, 36b, 36c, 36d generated due to the removal of a part of the original signal do not overlap on the frequency axis. On the other hand, FIG. 11(b) shows the case where the original spectrum 35 and another spectra 36a, 36b . . . 36e generated due to the removal of a part of the original signal overlap to each other.

Figure 11B:
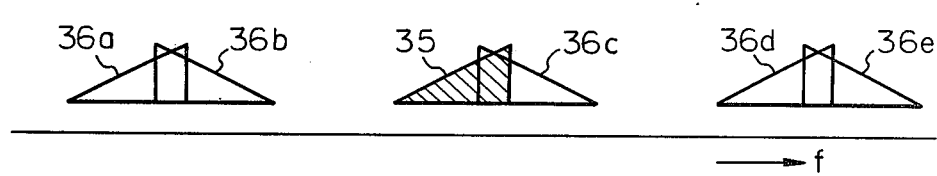
Figure 12:
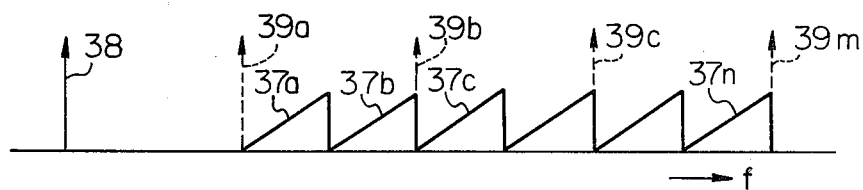
FIG. 12 is a drawing for the explanation of the effect of the segment frequency and the higher harmonics of the same.

When the original spectrum overlaps with another spectra generated by the removal of a part of the original signal as shown in FIG. 11(b), S/N (signal to noise ratio) will deteriorate, and undesirable cross talk will occur as the original spectrum can not be separated.

Therefore, the length of the segment must be designed so that the original spectrum does not overlap with the side spectra as shown in FIG. 11(a).

The condition that the original spectrum does not overlap with the side spectra is that the length T of the segment satisfies the formula below.

$$\frac{2 \times f_{min}}{n-1} \geq \frac{1}{T} \geq \frac{2 \times f_{max}}{n}$$

where n is an integer equal to or greater than 2, $f_{min}$ is the minimum frequency (Hz) of the spectrum in a single side band modulation signal, $f_{max}$ is the maximum frequency (Hz) of the spectrum in a single band modulation signal, T is the length of the segment (second).

Other undesired noise is caused by the frequency corresponding to the repetition period of the segment and the higher harmonics of the same. When said frequency and harmonics reside in the frequency band of the original spectrum, the speech quality will deteriorate. One of the solutions for getting rid of said noise in the frequency division multiplex telephone channel is that the repetition frequency of the segment is designed to be the integer multiple of the frequency allocation of the voice channels. For instance, when a voice channel is allocated in every 4 KHz, which is the most common in the current frequency division multiplex voice channel, the repetition frequency of the segment should be the integer multiple of 4 KHz. When the repetition frequency of the segment is designed as mentioned above, said repetition frequency and the higher harmonics of the same stand at the boundary (39a, 39b, 39c, . . . 39m) between the adjacent voice channels (37a, 37b, 37c . . . 37n), and thus neither voice channel is interferred.

It is apparent from the above explanation that the band compression for the modulated signal provides a large compression ratio, and as the multiplex voice channel is directly compressed, the apparatus can be simpler than that for the compression of the individual channels.

This invention has the following two advantages. First, in ordinary telephone circuits, a frequency band of 4 KHz is assigned to one circuit, but according to this invention transmission of voice signals of similar quality with 2-3 KHz frequency band per circuit is possible.

Secondly, band compression systems for voice signals invented in the past required one compression device on the transmitting terminal and one restoring device on the receiving terminal for each voice circuit. However, according to this invention, one compression device and one restoring device are used in common for multiple voice circuits. Therefore, this invention presents a less costly transmission line than the conventional line.

From the foregoing it will now be apparent that a new and improved frequency band compression system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A method of transmitting and receiving a plurality of voice signals using frequency band compression comprising the steps of: multiplexing in a transmission station the voice signals into a frequency division multiplex signal; dividing the multiplexed voice signal into a plurality of segments, each having a predetermined length (T), the length of the segment satisfying the formula:

$$(2 \times f_{min})/(n-1) \geq 1/T \geq (2 \times f_{max}/n)$$

where

T is the length of the segment;
n is the integer equal to or greater than 2;
$f_{min}$ is the minimum frequency (Hz) of the spectrum in a single side band modulation signal;
$f_{max}$ is the maximum frequency (Hz) of the spectrum in a single band modulation signal;

removing a part of each segment; processing the remaining portion of each segment in a first time proportional variable delay circuit wherein the delay time increases proportionally to the time, thereby lowering the frequency of the multiplexed voice signal by a predetermined ratio; processing, at a receiving station, the received signal in a second time proportional variable delay circuit wherein the delay time increases proportionally to the time, thereby raising the frequency of the received signal to reproduce the original multiplexed voice signal; and de-multiplexing the multiplexed voice signal into a plurality of voice signals.

2. The invention as defined in claim 1 wherein the repetition frequency of the segment is the same as the integer multiple of the frequency allocation of the voice channels.

3. The invention as defined in claim 1, wherein the interval of the channel allocation is 4 KHz.

4. The invention as defined in claim 1, wherein said voice signal is a modulated signal in which the frequency spectrum is higher than the original signal.

5. The invention as defined in claim 1, wherein said modulated signal is a single side band, amplitude modulation signal.

6. The invention as defined in claim 1, wherein said first time proportional delay circuit and said second time proportional variable delay circuit each include an analog delay element with a charge transfer device.

7. A frequency band compression system for a voice signal comprising multiplexing means for multiplexing a plurality of voice channels; dividing means coupled to the output of said multiplexing means for dividing the multiplexed signal into a plurality of segments and removing a part of each segment; a first time proportional variable delay circuit for extending the remainder of the segment to the duration of the full segment; a communication line for transmitting the signal from a transmitter to a receiver; a second time proportional variable delay circuit wherein the delay time decreases proportionally to the time; inserting means for inserting an idle signal into the part of the signal originally occupied by the removed part of each segment generated by said second delay circuit; and demultiplexing means coupled to the output of said inserting means for de-multiplexing the signal to provide reproduced voice channels.

8. The invention as defined in claim 7, wherein said first and second time proportional variable delay circuits comprise a saw tooth wave generator, a variable period pulse generator, the period of which is defined by the instant amplitude of the output of said saw tooth wave generator, a charge transfer device for providing the time proportional delay to the input signal and said charge transfer device being controlled by the output of said variable period pulse generator.

* * * * *